United States Patent
Kinnan et al.

(10) Patent No.: US 8,294,710 B2
(45) Date of Patent: Oct. 23, 2012

(54) EXTENSIBLE MAP WITH PLUGGABLE MODES

(75) Inventors: Keith Robert Kinnan, Snoqualmie, WA (US); Mher Hakobyan, Seattle, WA (US); Dereck Quan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 12/476,879

(22) Filed: Jun. 2, 2009

(65) Prior Publication Data

US 2010/0302236 A1 Dec. 2, 2010

(51) Int. Cl.
*G06T 15/00* (2011.01)
(52) U.S. Cl. .................................... 345/419; 345/629
(58) Field of Classification Search .................. 345/419, 345/629
See application file for complete search history.

(56) References Cited

U.S. PATENT DOCUMENTS 6,899,539 B1   5/2005   Stallman

OTHER PUBLICATIONS

J. Elson, J. Howell, and J. R. Douceur. Maperuncher: integrating the world's geographic information. SIGOPS Oper. Syst. Rev., 2007; pp. 1-8.*

Pietschmann, Chris; "Virtual Earth Silverlight: Using Tile Layers to Overlay Custom Map Imagery," Mar. 2009, 3 pp,; http://pietschsoft.com/post/2009/03/Virtual-Earth-Silverlight-Using-Tile-Layers-to-Overlay-Custom-Map-Imagery. aspx.
Malle, Stefano; "Technology Talks," Apr. 2008 (or earlier), 34 pp.; http://blogs.msdn.com/small.
Chan, Derek; "Customizing your own Mini-Map," Apr. 2009, 7 pp.; http://www.viawindowslive.com/Articles/VirtualEarth/CustomizingyourownMiniMap.aspx.
Pocketmapstore.com; "Pocketmap," Downloaded Apr. 2009, 2 pp.; http://www.pocketmapstore.com/pnpogpsnade1.html.
Brundritt, Richard; "Birds Eye Imagery Extraction via the Virtual Earth Web Services—Part 1," Sep. 2008-Jan. 2009, 27 pp.; http://rbrundritt.spaces.live.com/?_c11_BlogPart_pagedir=Next&_c11_BlogPart_handle=cns!E7DBA9A4BFD458C5!588&_c11_BlogPart_BlogPart=blogview&_c=BlogPart.
O'Brien, John; "Virtual Earth—What's New in the Latest Release," May 2008, 3 pp.; http://www.devx.com/codemag/Article/37940/1763.

* cited by examiner

*Primary Examiner* — Maurice L McDowell, Jr.
(74) *Attorney, Agent, or Firm* — Shook Hardy & Bacon L.L.P.

(57) ABSTRACT

An extensible map module allows facilitates development of new map styles and presentation elements. Projection and presentation functions are at least partially separated, so that new styles or modes can be developed without impacting existing presentation element features. Similarly, new presentation elements can be developed independently from a particular mode or style implementation.

17 Claims, 9 Drawing Sheets

520

EXTENSIBLE MAP WITH PLUGGABLE MODES

BACKGROUND

A variety of map styles are now available for viewing maps of locations. A typical style is an overhead view style from a satellite or plane, which can be referred to as an aerial style. Another type of available style is an oblique view style, which is from overhead, but at an angle. An alternative to photographic views are schematic representations of streets and other features.

Many on-line services now take advantage of map capabilities to enhance the user experience. Examples include services offering directions between various locations and businesses involved in real estate sales or rentals. For on-line services that offer maps, the user experience is often further enhanced if the user can be offered more than one style of map.

SUMMARY

A system and method are provided for displaying various types of map projections. The system and method allow for partial or full separation of the details of how to project a map from the details of how to present the map. By at least partially separating presentation and projection, new types of map projections can be readily implemented without having to modify the options available for presentation of the display. Similarly, new presentation features can be added independent of the methodology used for a map projection.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
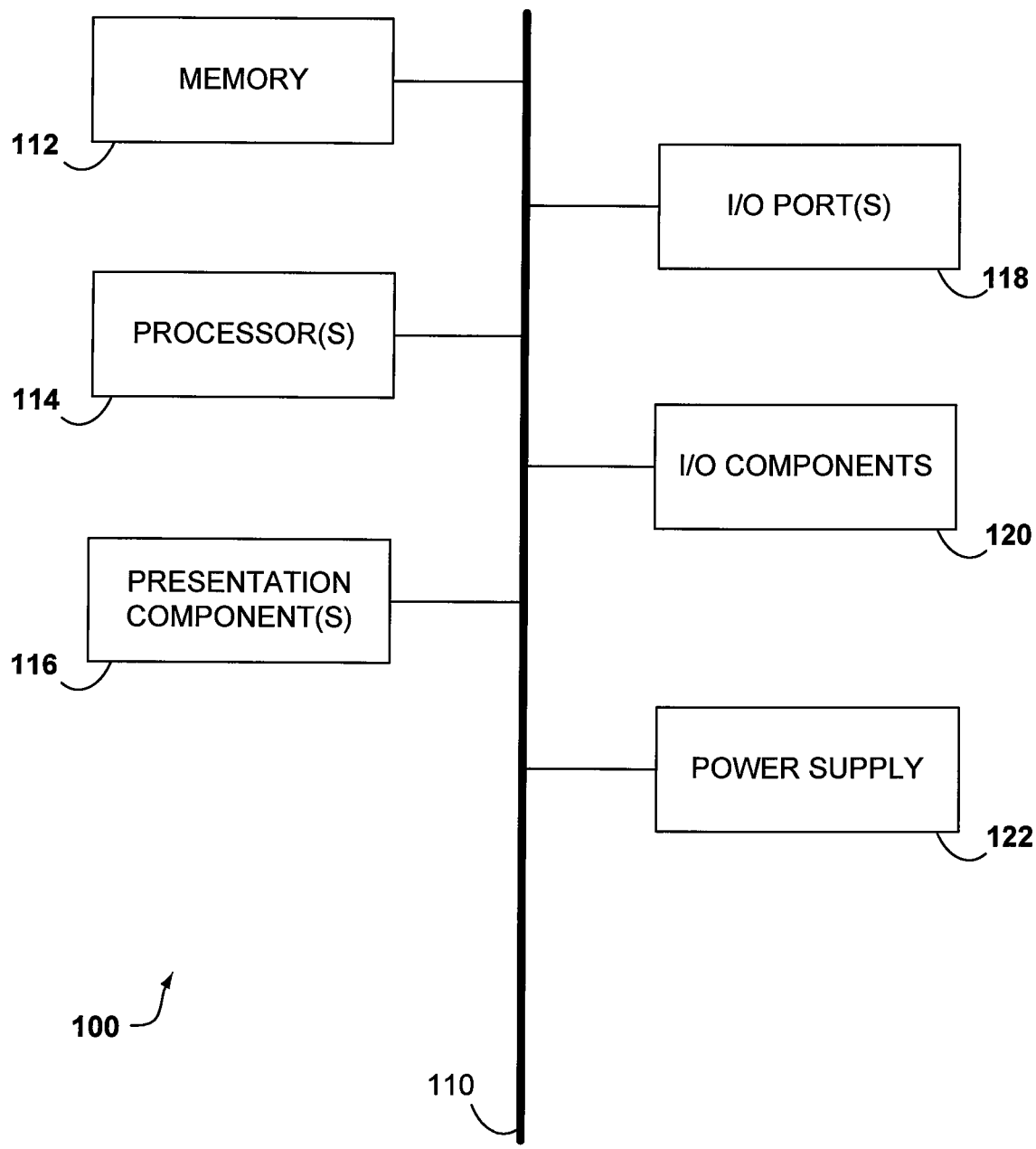
FIG. 1 is a block diagram of an exemplary computing environment suitable for use in implementing embodiments of the present invention.

In order to provide a view of a map in a given style, both a projection method and various presentation features or details can be defined. The projection method refers to how the three dimensional curved surface of the earth is represented in the two dimensional view available in a map. A commonly used projection for overhead views is a Mercator projection. In a Mercator projection, the surface of the globe (approximately a sphere) is mapped on to the surface of a cylinder. While this can cause some distortion, the mathematics for converting from latitude and longitude coordinates to a Mercator projection is well-known. However, styles such as a birdseye style can use a different type of projection. The presentation of a map view is how the map and any associated objects are displayed to a user. For example, if a pushpin is placed on a map view to indicate a place of interest, the pushpin is part of the presentation. If the pushpin is placed using coordinates, such as latitude and longitude, the location of the pushpin in the view is based on the projection method for the particular style.

One difficulty with the various map styles that are currently available is that they lack interoperability. Typically, the operations for projection and presentation are performed by a single module or related group of modules. The inputs for these modules are specific to the type of projection, with no insight provided regarding how to change to another type of projection. When a user wishes to switch from one style to another, the two map styles will have little or no ability to share information. Instead, any information or additional objects that form part of the presentation in the first style will likely have to be manually added again by the user in the view displayed in the second style.

In order to overcome this barrier, in various embodiments an extensible map module is provided that facilitates switching between multiple map styles or map modes while preserving any information added to the presentation. A map module can provide functionality for presenting map tiles and overlay objects in a view. The map tiles for use in a style, as well as the mathematics for performing the projection associated with a style, can be handled by a second module that defines the style or map mode.

Separating the projection and presentation features in a map, in part by handling projection in a separate module or group of modules, provides a variety of advantages. First, a user interested in developing a new type of projection can focus only on the projection, while leaving presentation details to be handled by an existing routine. The user developing the new projection does not need to know about how the presentation portions of the map operate. Instead, the user only needs to know what inputs and outputs the primary map module is expecting. Similarly, a user interested in developing new presentation objects will be able to use the new objects with any projection, without having to know the details of how the projection operates.

Separating the presentation and projection functions also provides operational advantages for a map. Since the presentation is handled separately from the projection, the map can readily switch from one projection style to another while retaining any overlay objects added to a view. In preferred embodiments, the presentation module does not change during a style or map mode change, so any information regarding the presentation of the current view is still available in the map module after selecting a new style. This information is simply forwarded to the new style or mode, so that the presentation objects can be correctly placed in the view based on the new projection.

In some embodiments, still another advantage of an extensible map module is the ability to customize the behavior of input and devices, such as the mouse. Preferably, the map module can provide a default set of operations that are performed in response to various mouse or keyboard activities, such as zooming, centering the view, etc. These default actions can be replaced in the projection module by alternative actions that are desirable for the given projection.

Displaying Map Views

There are a variety of ways to display a map view to a map user. One way to display a map involves the use of a series of content tiles. Content tiles are tiles that represent different pieces of the map that could be displayed. By using more than one content tile, a larger map area can be displayed. The tiles are similar to puzzle pieces, so selecting an area of the map for viewing is similar to selecting the appropriate puzzle pieces, or tiles, and arranging them together to create a map of a desired area. Because the tiles represent a two dimensional representation (on a computer screen) of a three dimensional object (usually the earth), the tiles represent a projection of the three dimensional object in the two dimensional representation.

Once the appropriate group of map tiles have been arranged together to display a given area, a portion of those map tiles can then be displayed to the user. In the discussion below, the portion of the map tiles displayed to the user will be referred to as the view. This view is displayed in a viewport. A viewport represents a window or display of some sort on a computer screen. The terms view and viewport will be used here for clarity, but those of skill in the art will recognize that these terms are not intended to be limiting in the nature of the display method used to provide a map display to a user.

When a portion of a map is displayed in a viewport, each location or point in the viewport corresponds to a location in the displayed map, and therefore corresponds to a set of real world coordinates such as longitude and latitude coordinates. Part of the task in displaying a map area for viewing is correlating the real world coordinates of a place with a location in the content map tiles. This correlation is defined by the projection used to create the map tiles. The combination of the projection methodology and the particular content tiles can be referred to as a map style or map mode. The style or mode can optionally include other types of display objects.

Another aspect of displaying the appropriate map to a user is selecting an appropriate level of zoom or scale. Depending on the scale, a larger or smaller map area can be displayed in a view having the same size in a viewport. Preferably, more than one zoom level will be available for display of a map area to a user. Multiple zoom levels can be provided to the user in any convenient manner. For example, one method for providing multiple zoom levels would be to have multiple discrete zoom levels or map scale options. For each zoom level, a different set of content tiles would be available. When a user selects a different zoom level, the map could be redisplayed using the set of content tiles corresponding to the new zoom level. In another embodiment, the map scale or zoom level can be a continuous variable. In such embodiments, the zoom level can be set by starting with a set of content tiles that have a certain pixel density. As the user increases the scale, or zooms out, some of the information in the picture would not be necessary, as a lower pixel density could be used to display the map. In still another embodiment, different scales can be provided by using a mixture of multiple content tile sets and continuous zoom within a given content tile set.

Map and Map Mode Modules

In various embodiments, the activities necessary for displaying a view of a map in a viewport can be divided into two categories. One category of activities can be handled by a Map module, which provides a framework and interface for displaying a map view. The Map module can provide the presentation of a map view to a user via a display window. The Map module can also include basic features for displaying or overlaying objects in a map view. The Map module can further receive any user input regarding the desired map display. Upon receiving such input, the map module can either handle the request directly, or pass the request to the projection module, or Map Mode module, for handling. Note that while the Map module is referred to as a single module, in various embodiments one or more modules can be used to perform the above category of activities.

In various embodiments, the other category of activities can be handled by a Map Mode module or modules. A Map Mode module can provide the components for a particular map style. The Map Mode can include a specification for the tiles or other content objects that will be used for the basic map presentation. A method for projecting coordinates to a location in the viewport can also be included. These components allow the Map Mode to provide the Map module with the information needed to present the basic map layer and calculate the appropriate location in a view of any overlaid objects. Optionally, the Map Mode can further include specifications for other features or objects that are displayed in a view.

In an embodiment, the Map module can be implemented as a Map class with a Mode property to provide the mechanism for future pluggability. This property is of type MapMode which is an abstract class with an interface that abstracts out mapping projection calculations as well as presentation of those MapModes.

When a user sets the Map Mode property on the Map, the current Map Mode is deactivated and the new one is activated. The map can query a property of the Map Mode to get the relevant content tiles or other content data structures for that Map Mode and show it on the map as the base map content. When the user sets the View on the Map or adds custom content layers or objects to the map, the Map Mode needs to perform calculations to determine what view to show and to position content within that view. When a user sets the View, such as by setting one or more of a center latitude/longitude, a zoom level or other definition of a map scale, a pitch, a heading, or another property that can define a view, it forwards the View calls to a SetView method on the Map Mode. This gives the Map Mode module the ultimate flexibility in determining how to render that view in that Mode. When content is positioned and the Map needs to place the content in the appropriate location in the viewport, it forwards the calls to the Map Mode module so the Map Mode has the flexibility to define and determine the latitude/longitude to screen point calculation without the Map module having to know the details. If a user clicks on the view in the viewport to determine a location (such as latitude, longitude, and optionally altitude), the Map module has a call which converts a screen point or location in the viewport to real world coordinates (latitude/longitude/altitude). This gives the Map Mode module complete flexibility to do this calculation.

In an alternative embodiment, when user input occurs such as mouse input (clicks, drags, wheel), touch screen input (one or more types of finger or stylus gestures), or keyboard input, the Map forwards the user input events to the Map Mode for customization. For example, the Map module could include default behavior for various types of user input events. This provides for extensibility so future Map Mode modules with custom input navigation do not need to require updates to the core control. For example, a mousewheel event in a Mercator mode may zoom in on the center latitude/longitude location, but in street view, it may move the center point to move the view down the street. If the Map Mode does not customize the input behavior, such as in a Mercator type mode, then the Map can perform a default action with that action. If the Map Mode handles the event instead, the Map Mode can override the default behavior of the Map module.

Future map modes can be developed and released independently of the core Map module and released in separate assemblies. Customers can also build their own custom Map Modes that have an appropriate Map Mode interface and plug them into the Map. This design allows the flexibility to extend the capabilities of maps without requiring changes to the core control assembly.

In various embodiments, the Map module also handles the placement of any additional objects in the map presentation. Such additional objects could include push pins, text boxes, geometric objects corresponding to an area or building, or any other object a user defines. The user can specify the location of objects using latitude and longitude, by clicking on one or more locations in a map view and having the map module determine coordinates, or by any other convenient method. The user objects can be pre-defined shapes or a picture or object the user has drawn or imported into the map application. For an object that requires more than one coordinate to uniquely specify a position, this can also be accomplished by any convenient method, such as by specifying a location for all vertices of a regular polyhedron.

In an embodiment, the design of the Map module can include a number of interfaces. The map module can include at least one method for setting and/or getting a view in the viewport displayed to the user; at least one method for setting or getting the Map Mode; at least one method for asking the Map Mode to convert a location in a viewport to a coordinate system; and at least one method for asking the Map Mode to convert coordinates to a location in a viewport.

Various types of Map Modes can be constructed. For example, an Aerial MapMode can be composed of Mercator Projection calculations with aerial tiles for presentation. The aerial tiles can be related to each other in any convenient method. In another example, a Street Map Mode can consist of a special Street projection calculation and have a Microsoft PhotoSynth interface for presentation.

In an embodiment, the design of a Map Mode module or modules can include a variety of interfaces. The interfaces include at least one method for specifying content tiles or other content elements of the main map display; optionally at least one method for displaying a foreground or overlay content element on the map; at least one method for getting and setting the view in the viewport; at least one method for converting coordinates to a location in the viewport; and at least one method for converting a location in the viewport to coordinates. Optionally, the Map Mode can also include interfaces for handling one or more types of user input events, such as mouse click or move events, keyboard press or hold events, or other types of user generated events.

Examples

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In another embodiment, computer storage media includes tangible computer readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
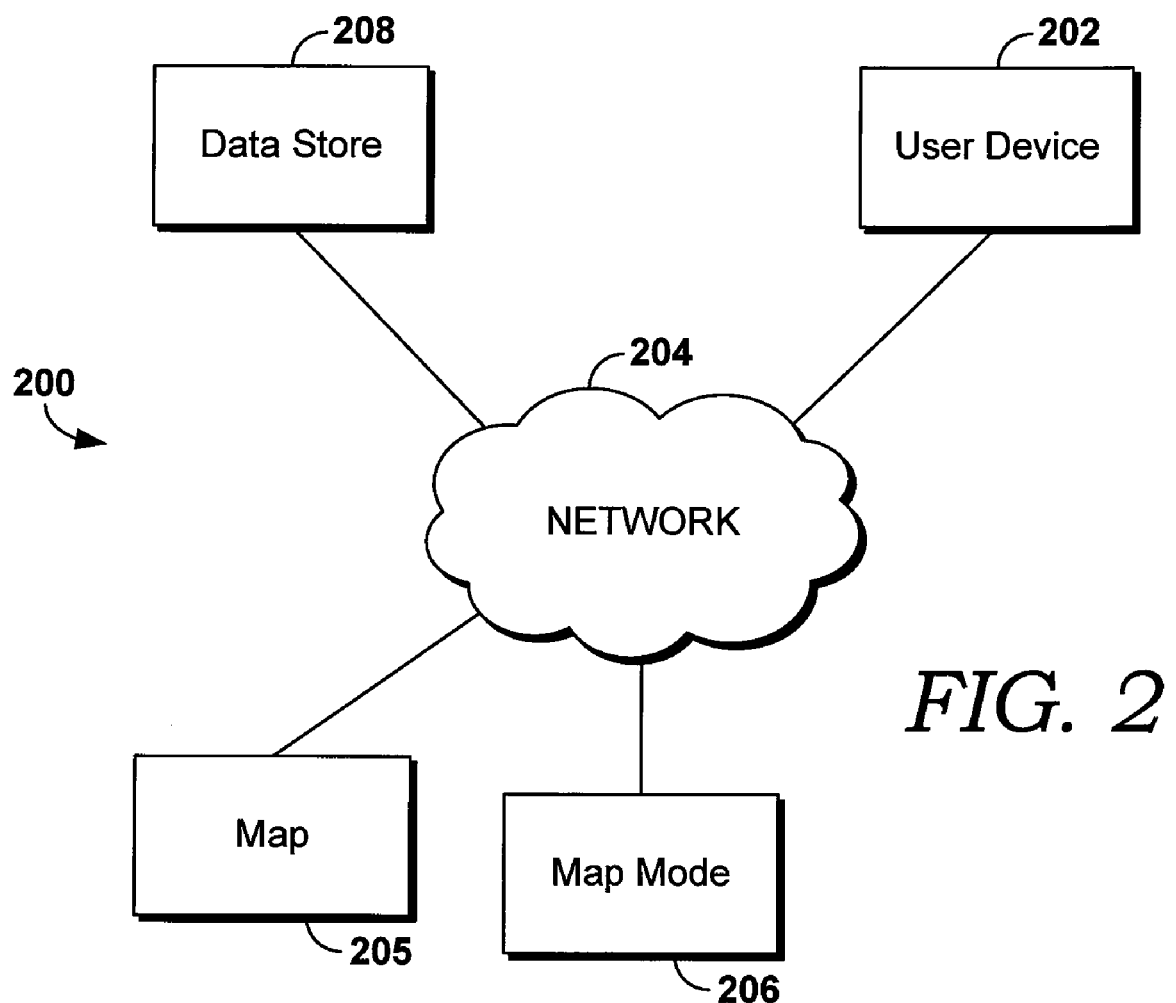
FIG. 2 schematically shows a computing system suitable for performing embodiments of the invention.

Turning now to FIG. 2, a block diagram is illustrated, in accordance with an embodiment of the present invention, showing an exemplary computing system 200 configured to facilitate display of map views in various map modes. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a user device 202, a Map module 205, a Map Mode module 206, and a data store 208, all in communication with one another via a network 204 and/or via location on a common device. The network may include, without limitation, one or more local area networks (LANs) and/or wide area networks (WANs). Such networking environments are commonplace in offices, enterprise-wide computer networks, intranets and the Internet. Accordingly, the network 204 is not further described herein.

The data store 208 is configured to store information related to the content tiles used to display a view in a given map mode. Though illustrated as a single, independent component, data store 208 may, in fact, be a plurality of data stores, for instance, a database cluster, portions of which may reside on the user device 206 or another external computing device (not shown).

User device 202 shown in FIG. 2 may be any type of computing device, such as, for example, computing device 100 described above with reference to FIG. 1. By way of example only and not limitation, user device 202 may be a personal computer, desktop computer, laptop computer, handheld device, mobile handset, consumer electronic device, and the like. Additionally, the user device 202 may further include a keyboard, keypad, stylus, joystick, and any other input-initiating component that allows a user to provide wired or wireless data to the network 204, e.g., search queries, web page addresses, and the like. It should be noted, however, that the present invention is not limited to implementation on such computing devices, but may be implemented on any of a variety of different types of computing devices within the scope of embodiments hereof. The Map module 205 and Map Mode module 206 can be any of the various embodiments contemplated above or below, and thus are not described further in connection with FIG. 2.

Figure 3:
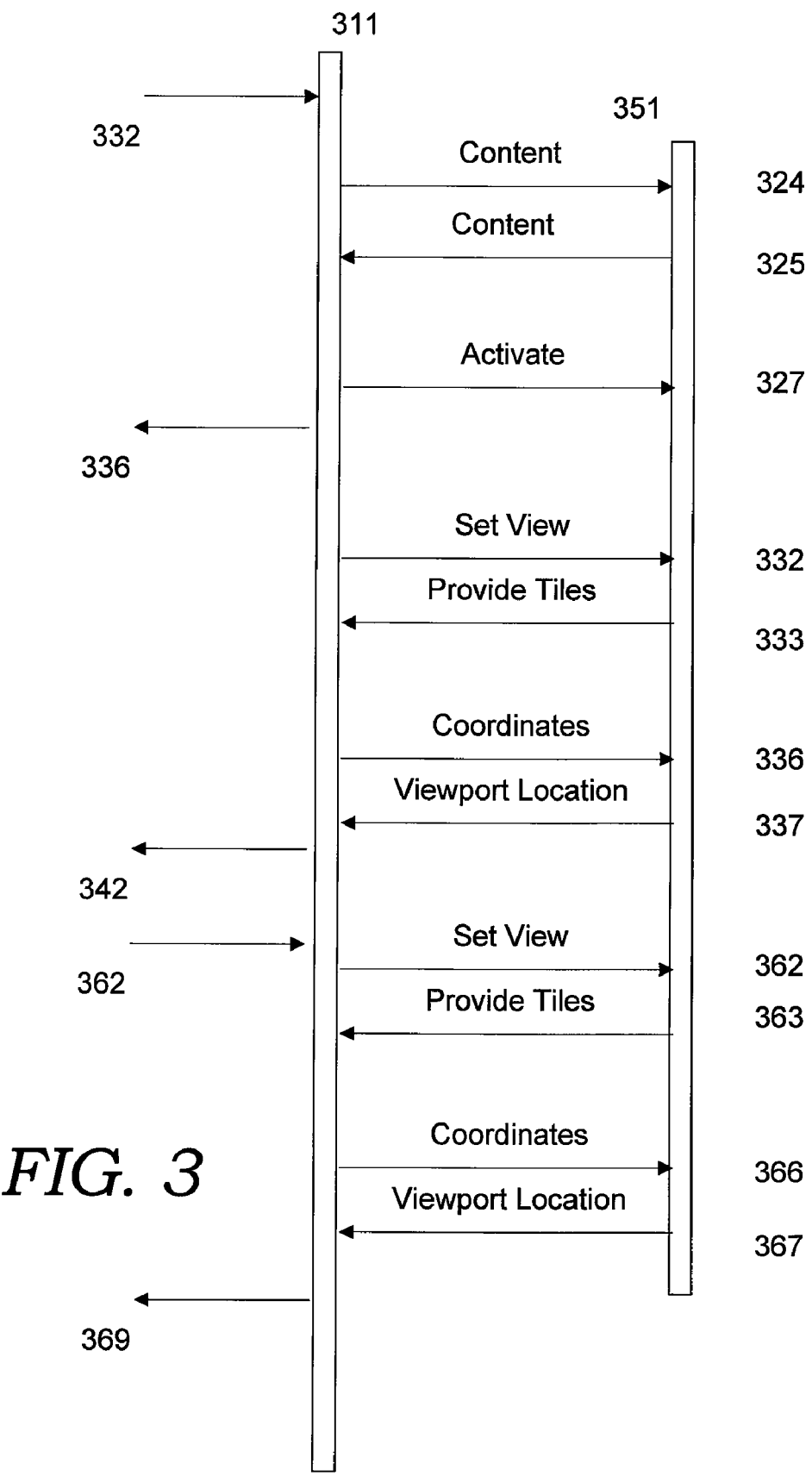
FIG. 3 schematically shows a process flow during operation of an embodiment of the invention.

FIG. 3 shows an example of the interaction between a Map module and a Map Mode Module. In FIG. 3, vertical bars 311 and 351 schematically represent the interfaces of a Map module and a Map Mode module. In the embodiment shown in FIG. 3, all of the communications from Map Mode 351 are directed to Map 311. Map 311 communicates with Map Mode 351, with the user, and with other modules. Moving from top to bottom along the diagram, FIG. 3 shows the various inputs and outputs that occur during selection of a mode, display of a view, and then a change in the displayed view by the user. Note that in some alternative embodiments, additional input can be provided to Map Mode 351 without first passing through Map 311. For example, a specialized Map Mode property or method could be accessed directly by a user.

In the embodiment shown in FIG. 3, the user provides input 332 to Map 311 that the new mode "Road" is desired. Prior to the mode selection, Map 311 is currently presenting a view in a viewport of a location along with an additional user provided "child" object in the view. When the new mode "Road" is selected, Map 311 will take the appropriate actions to allow the current view and the associated children to be redisplayed in the new mode. Based on input 332, Map 311 requests 324 and receives 325 information about the content tiles for the Road map mode from Map Mode module 351. After determining where to access the appropriate content tiles, Map 311 informs Map Mode 351 that the mode "Road" is activated 327.

After activation, Map 311 begins the process of displaying the current view in the new mode. Map 311 informs the Map Mode 351 of the current view with a SetView request 332. In response to the SetView request 332, Map Mode 351 provides identification of the appropriate content tiles 333 for display. Map 311 also informs other modules that the mode has changed 336. After informing any other modules of the mode change event, Map 311 requests the information needed to present children elements in the view. In the example shown in FIG. 3, the object can be displayed by specifying a single point. Thus, one request 336 is made to Map Mode 351 for conversion of coordinates to a location in the viewport view. Corresponding answer 337 provides Map 311 with the information necessary to display the child object in the correct location in the viewport. The answer 337 is based on the projection algorithm used by the Road Mode. While only a single point object is shown in this example, any number of additional requests could be made to Map Mode 351 so that any number of arbitrarily complex child objects could be represented at the correct location in the viewport. Finally, Map 311 displays the appropriate view 342 to the user in a viewport. Display of the appropriate view is an action that can be handled in a variety of ways. Updated presentation content can be provided to the viewport as soon as it is available. Alternatively, Map 311 can wait to display a new view until all data is available for presentation of the view and any associated child objects. Note that in some embodiments, the exact view shown in a first Map Mode may not be available for some reason in the new Map Mode. In such situations, the Map Mode can provide a constrained or otherwise modified "best view", that will then be displayed by Map when the view is requested.

At a later time, the user requests 362 that view should be modified in some manner. This can represent a mouse click, a keyboard key push, or any other appropriate user input to indicate a desire to change the view. Map module 311 receives this input as a request 362 to set a new view. Based on the request, Map module 311 sends a Set View request to Map Mode 351. Map Mode 351 responds 363 with the content tiles needed for the new view. Map also requests new projection 366 from Map Mode 351 so that the child object can be displayed appropriately in the new view, and Map Mode 351 responds with answer 367. The change view is then displayed 369.

Figure 4:
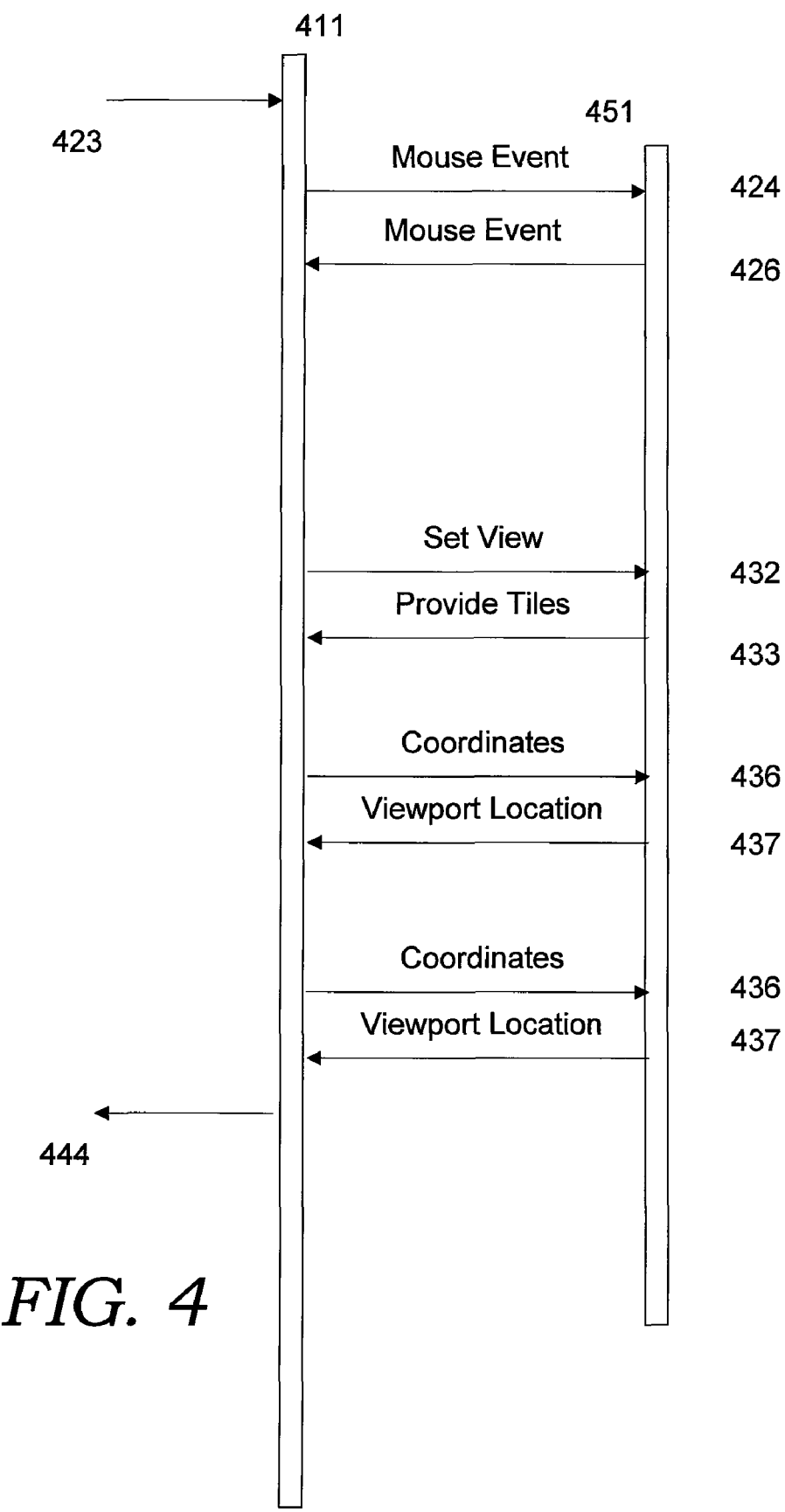
FIG. 4 schematically shows a process flow during operation of an embodiment of the invention.

In some embodiments, a Map Mode can provide alternative definitions for the meaning of input events from a user. FIG. 4 is an example of such an embodiment. In FIG. 4, a map view is currently being displayed by Map 411 in a viewport. In this example, the displayed view includes at least two child objects. The current Map Mode 451 is "Road" mode, which in this embodiment has some mode specific definitions for how to interpret mouse events, such as mouse clicks, dragging a box using a mouse, or using the mouse wheel. In FIG. 4, a mouse event 423 is detected by Map 411. The mouse event is forwarded 424 to Map Mode 451 for interpretation. The effect of mouse event 423 is a request for a new view, such as a view centered or zoomed on a new location, and this answer is provided back 426 to Map 411. Based on this answer, Map 411 requests the new view 432 from Map Mode 451. As before, Map Mode responds 433 with the needed tiles to display the new view. Map 411 also requests the projection information 436 to display the child object, and Map Mode 451 provides this answer 437 as well. The new view is then displayed 444.

Figure 5:
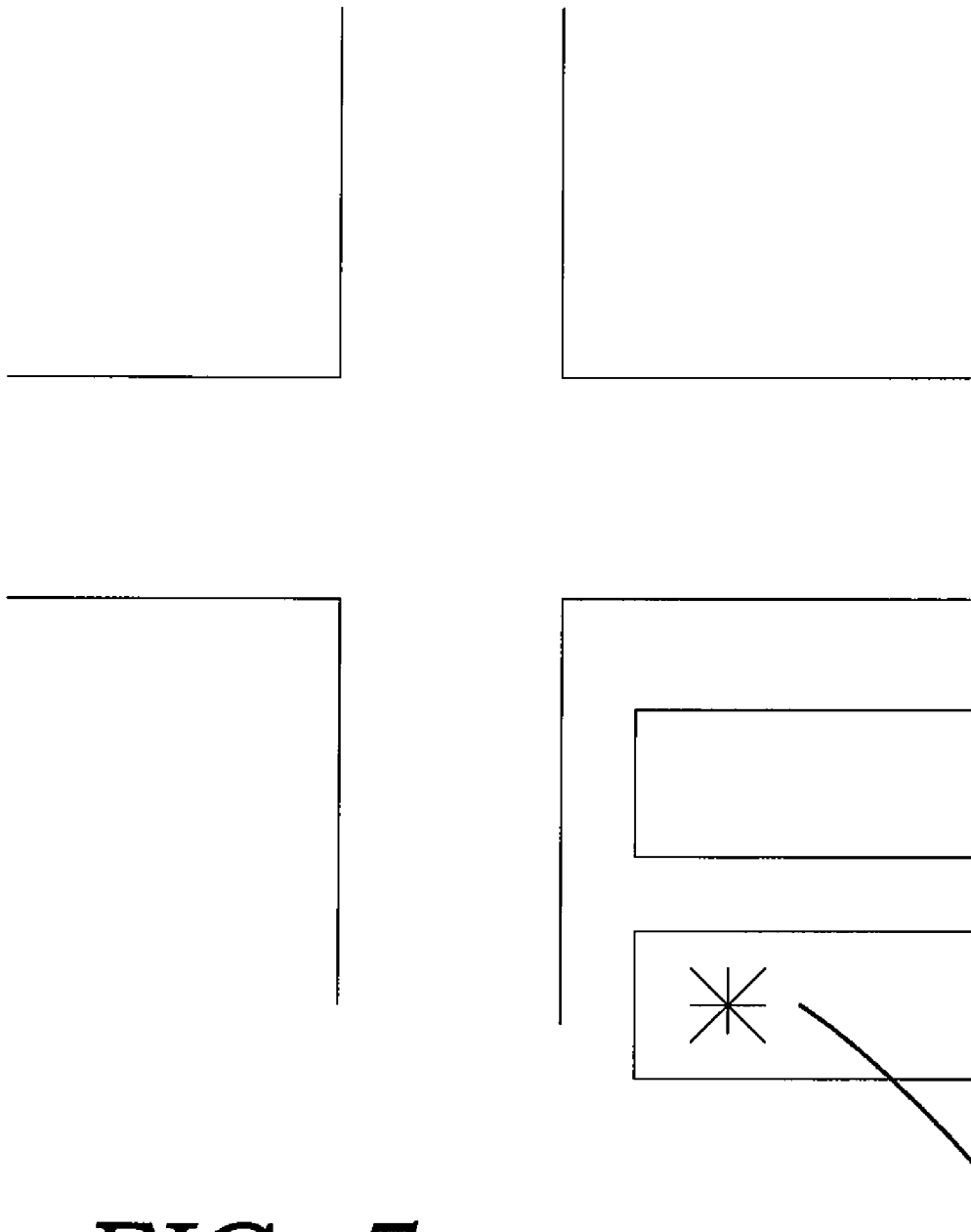
FIG. 5 provides a schematic cartoon of a sample view.
Figure 6:
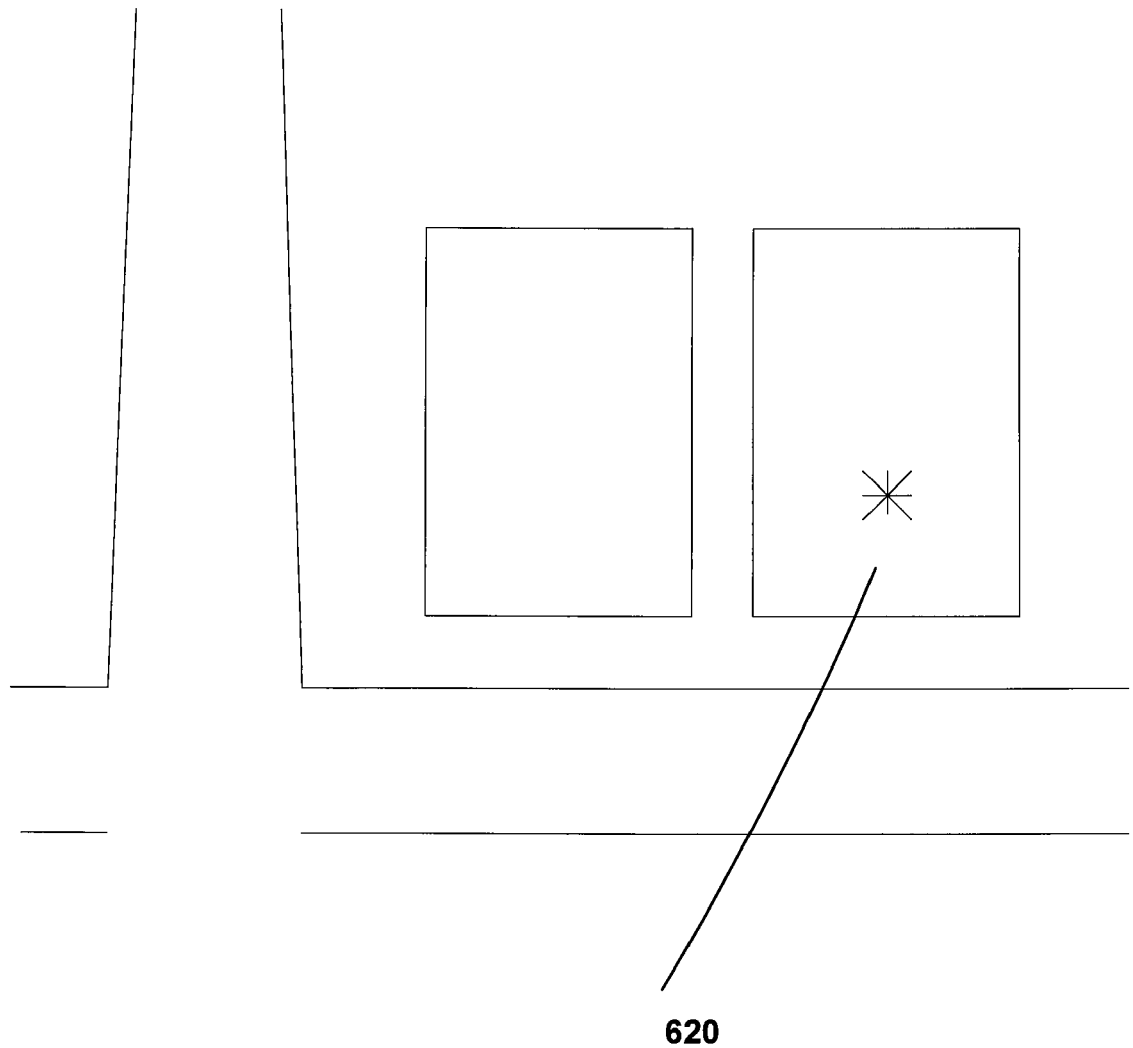
FIG. 6 provides a schematic cartoon of the sample view in a different mode.

FIGS. 5 and 6 schematically show examples of views of a location in two different modes. In FIG. 5, a view is shown with an overhead perspective that displays only the roads. A display object 520 indicates an object added to the view to mark a desired location. In FIG. 5, the view is centered on a location adjacent to the display object 520. In this view, the projection is a projection similar to a Mercator projection.

FIG. 6 schematically shows a "street" view centered on the same location. Rather than providing an overhead view, this mode provides a view from roughly ground level. In FIG. 6, the view is centered on the same street corner. A building is present on the corner. The marked location 620 is a neighboring building, which is visible toward the right of the view. In various embodiments of the invention, upon switching from a first mode to a second mode, a Map module will be able to provide a view centered on the same location in the new mode that also includes any child objects in the appropriate location in the view. Preferably, at least one of the first mode and the second mode will be a mode that includes a projection method that is different from a Mercator projection. Optionally, both modes can be modes with a projection method different from a Mercator projection.

Figure 7:
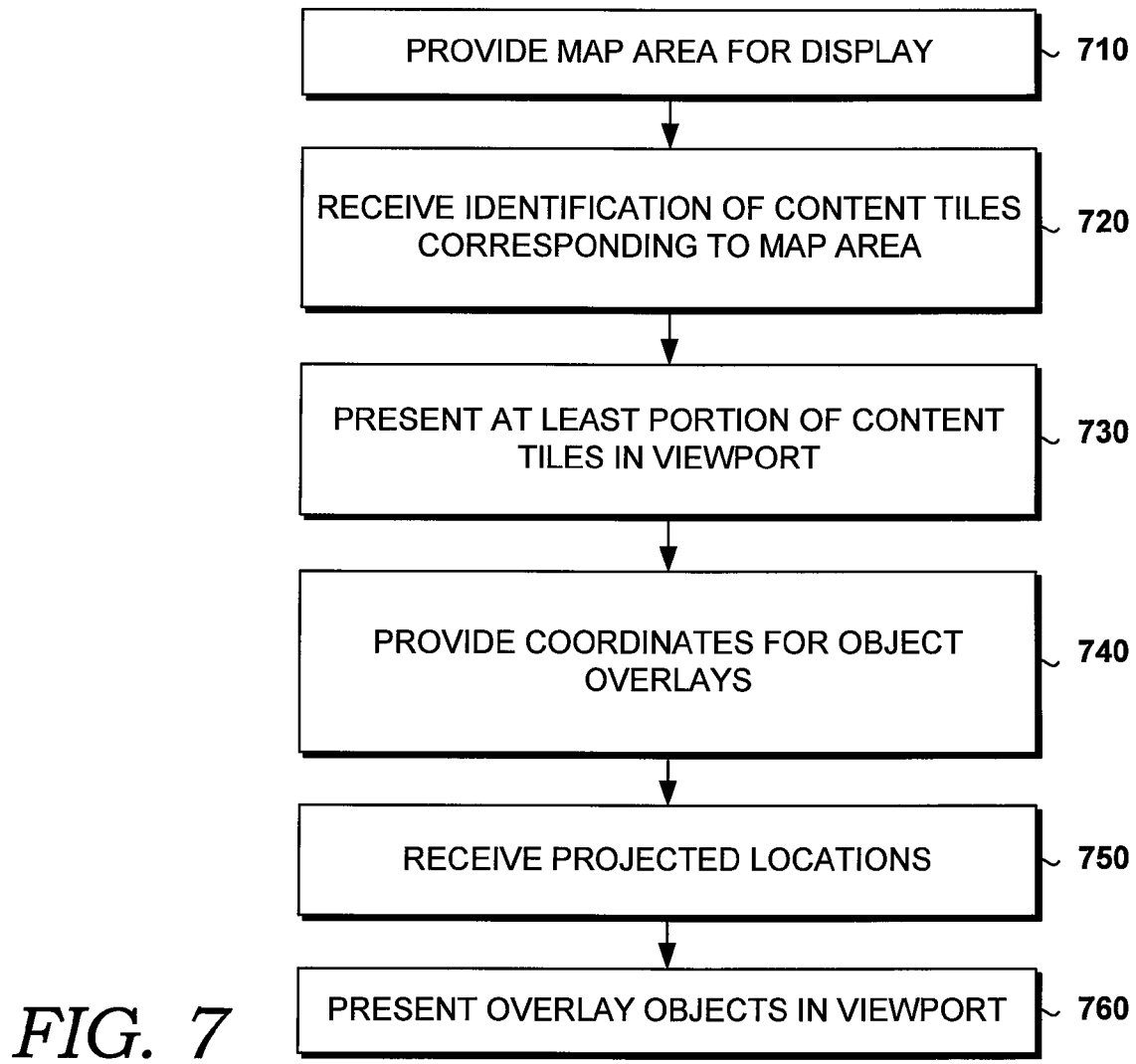
FIG. 7 depicts a flow chart of a method according to an embodiment of the invention.

FIG. 7 depicts a flow chart showing a method according to an embodiment of the invention. In FIG. 7, the method shown is from the point of view of a Map module that receives input from a user, displays output to a viewport, and both sends and receives information from interfaces of a selected Map Mode module. In FIG. 7, a map area for display is provided 710 to a map mode module. The map area for display can be identified by any convenient method. The map area can be identified based on a center point, based on a bounding box, or another definition that indicates content that should be included within the displayed view. In response, the Map module receives an identification 720 of one or more content tiles from the map mode module. The content tiles represent the tiles needed to display the map area. It is likely that the content tiles will represent a map area larger than the map area for display. Thus, when the identified content tiles are presented in a viewport 730, only a portion of the identified content tiles may be visible in the viewport. Coordinates for at least one overlay object are also provided 740 to the map mode module. In response, a projected location in the viewport corresponding to the coordinates is received 750 for each of the at least one overlay objects. The at least one overlay objects are presented 760 in the viewport at each projected location. Note that in FIG. 7, the presentation of the content tiles 730 is shown as a separate step from presentation of the overlay objects 760. Alternatively, the content tiles and overlay objects may be presented at the same time, or the content tiles may be presented during the calculation of the projected location for at least some of the overlay objects.

Figure 8:
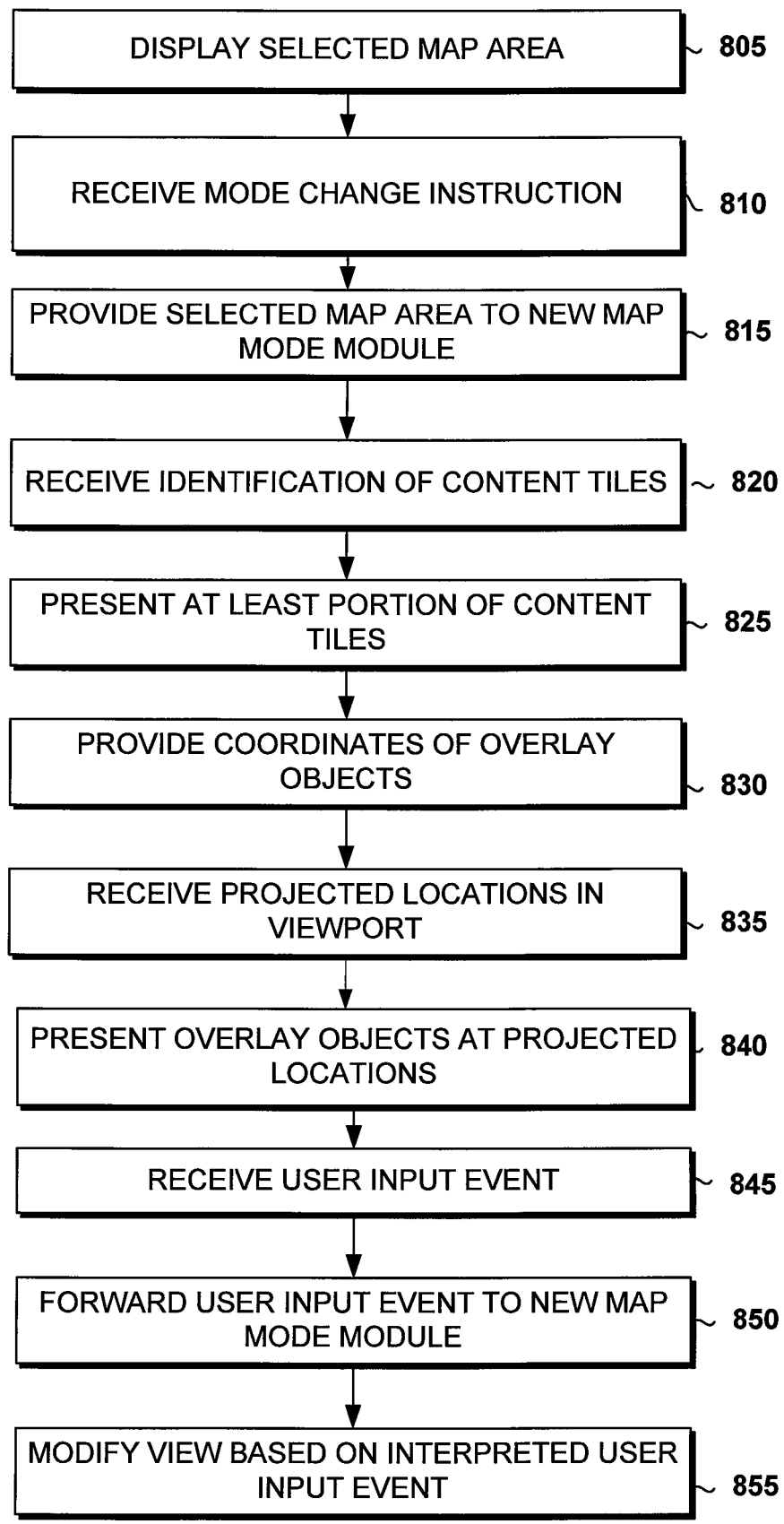
FIG. 8 depicts a flow chart of a method according to another embodiment of the invention.

FIG. 8 depicts a flow chart showing a method according to another embodiment of the invention. In the embodiment shown in FIG. 8, a user has selected a map area to view in a first map mode. The method shown in FIG. 8 provides a possible embodiment for responding to the selection of a second map mode, and then modifying the view in the second map mode based on further user input. In the embodiment shown in FIG. 8, the method begins at a point where a view of a previously selected map area is being displayed in a viewport 805. The map area is displayed in a first map mode. At least one overlap object is also presented in the viewport. An instruction is then received 810 to change the displayed view to a second map mode. The previously selected map area is provided 815 to a map mode module corresponding to the second map mode. In response, an identification of one or more content tiles is received 820 from the map module corresponding to the second map mode. At least a portion of the identified tiles are presented 825 in a viewport. Depending on the embodiment, the viewport used for displaying the view in the first map mode can be used to present the view in the second map mode. Alternatively, a new viewport can be used to display the view of the map area in the second map mode. The coordinates of at least one overlay object 830 are also provided to the map mode module corresponding to the second map mode. In response, a projected location in the viewport corresponding to the coordinates is received 835 for each of the at least one overlay objects from the map mode module for the second map mode. The at least one overlay objects are presented 840 in the viewport at the projected locations. After presentation of the content tiles and overlay objects, a user input event is received 845. The user input event is forwarded 850 to the map mode module for the second map mode for interpretation. The view in the viewport is then modified 855 based on the interpreted user input event. The modification could include displaying a new map area in the view, changing the scaling of the map area, or another desired view change.

Figure 9:
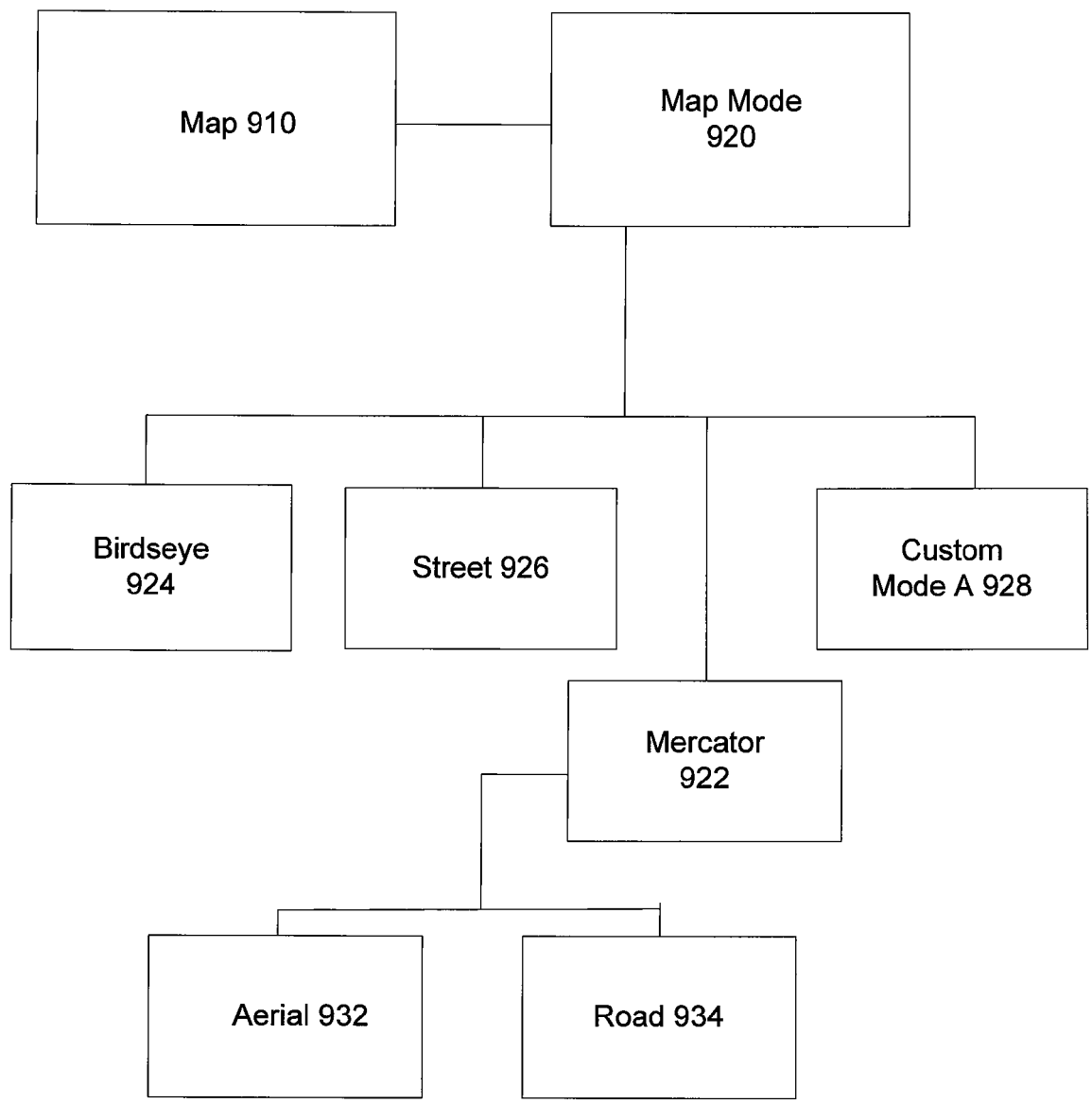
FIG. 9 schematically shows the relationship between various components in an embodiment of the invention.

FIG. 9 schematically shows the relationship between a Map module and a Map Mode module according to an embodiment of the invention. In FIG. 9, Map 910 represents the module or modules that coordinate the presentation of a map view to a user via a viewport. Map module 910 communicates with Map Mode 920. Map Mode 920 provides the underlying presentation tiles or content pieces, and also provides the mathematical calculations needed for projecting a given coordinate to a location in the viewport, and vice versa. Individual modes 922, 924, 926, and 928 represent examples of modes that a user can select as a MapMode 920. Birdseye mode 924, street mode 926, and custom mode A 928 can be any modes suitable for displaying a map, and do not necessarily have any relationship other than having the appropriate interfaces for communicating with Map module 910. The structure of FIG. 9 implies that aerial mode 932 and road mode 934 have some type of commonality, as they are both shown as belonging to the more general Mercator mode 922. For example, aerial mode 932 and road mode 934 could both use the same Mercator projection algorithm, but use different tiles for the underlying map presentation. However, in another embodiment, aerial mode 932 and road mode 934 can be independently formed modes, with both different content tiles and independently coded projection algorithms.

Additional Embodiments

In an embodiment, one or more computer-storage media storing computer-useable instructions that, when executed by a computing device, perform a method for displaying a map view in a viewport are provided. The method includes providing, to a map mode module, a map area for display. An identification of one or more content tiles corresponding to the map area is received from the map mode module. At least a portion of the identified content tiles are presented in a viewport. Coordinates for at least one overlay object are also provided to the map mode module. A projected location in the viewport corresponding to the coordinates for each of the at least one overlay objects is received from the map mode module. Each of the at least one overlay objects are then presented in the viewport at the projected locations.

In another embodiment, a computer implemented method for displaying a map view in a viewport is provided. The method includes displaying a view, in a first map mode, in a viewport that includes at least one overlay object presented in the viewport. In this embodiment, the view corresponds to a previously selected map area. An instruction is then received to change the displayed view to a second map mode. The previously selected map area is provided to a map mode module corresponding to the second map mode. An identification of one or more content tiles corresponding to the previously selected map area is received from the map mode module corresponding to the second map mode. At least a portion of the identified content tiles are presented in a second viewport. The coordinates of at least one overlay object are also provided to the map mode module corresponding to the second map mode. A projected location in the viewport corresponding to the coordinates of each of the at least one overlay objects is received from the map mode module corresponding to the second map mode. Each of the at least one overlay object is then presented in the second viewport at the projected locations. A user input event is then received. The user input event is forwarded to the map mode module corresponding to the second map mode for interpretation. The view in the second viewport is modified based on the interpreted user input event.

In still another embodiment, a computer based system for displaying map views is provided. The system includes a map module having a plurality of interfaces. The interfaces include an interface for presenting map areas and associated overlay objects as a view in a viewport. The interfaces also include an interface for sending and receiving map area data, coordinate data, viewport location data, or a combination thereof to a first map mode interface. The interfaces further include an interface for receiving user input events. Additionally, the interfaces include an interface for forwarding user input events to a second map mode interface. The computer based system also includes a map mode module having an algorithm for converting coordinates to a projected viewport location. The module also has a plurality of interfaces, including an interface for receiving map area data, coordinate data, viewport location data, or a combination thereof from a map interface. The plurality of interfaces further includes an interface for receiving input events from a second map interface. The plurality of interfaces also includes an interface for providing content tiles to a third map interface. The plurality of interfaces further includes an interface for providing viewport location data, coordinate data, or a combination thereof to a fourth map interface. Additionally, the plurality of interfaces includes an interface for providing interpreted input events to a fifth map interface. The computer based system also includes a plurality of content tiles, the content tiles being associated with the algorithm for converting coordinates to a projected viewport location.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A computer implemented method for displaying a map view in a viewport, comprising:
    providing, to a map mode module, a map area for display;
    receiving an identification of one or more content tiles corresponding to the map area from the map mode module;
    presenting at least a portion of the identified content tiles in a viewport;
    providing, to the map mode module, coordinates for at least one overlay object;
    receiving, from the map mode module, a projected location in the viewport corresponding to the coordinates for each of the at least one overlay objects;
    presenting each of the at least one overlay objects in the viewport at the projected locations;
    receiving one or more foreground content objects from the map mode; and
    displaying the foreground content objects from the map mode in front of the content tiles, but behind the at least one overlay object.

2. The computer implemented method according to claim 1, the method further comprising:
    receiving a user input event;
    forwarding the user input event to the map mode for interpretation;
    modifying the view in the viewport based on the user input event as interpreted by the map mode.

3. The computer implemented method according to claim 2, wherein the user input event comprises at least one of a mouse click, a mouse double click, a mouse wheel movement, a mouse movement, or a keyboard key press.

4. The computer implemented method according to claim 1, wherein the projected locations in the viewport window are based on a Mercator projection.

5. The computer implemented method according to claim 1, wherein the projected locations in the viewport window are based on a projection different than Mercator projection.

6. The computer implemented method according to claim 1, further comprising
    receiving a request to identify the coordinates of a viewport location;
    forwarding the viewport location to the map mode module;
    receiving, from the map mode module, the coordinates corresponding to the viewport location.

7. The computer implemented method according to claim 1, wherein the at least one overlay object is a push pin.

8. The computer implemented method according to claim 1, wherein the at least one overlay object is a polygon, a position of the polygon being specified by a plurality of sets of coordinates so that both position and orientation are determined for the polygon.

9. The computer implemented method according to claim 8, wherein the plurality of sets of coordinates are provided to the map mode for calculation of a plurality of projected locations that determine a viewport position and viewport orientation for the polygon.

10. A computer implemented method for displaying a map view in a viewport, comprising:
- displaying a view, in a first map mode, in a viewport that includes at least one overlay object presented in the viewport, the view corresponding to a previously selected map area;
- receiving an instruction to change the displayed view to a second map mode;
- providing the previously selected map area to a map mode module corresponding to the second map mode;
- receiving an identification of one or more content tiles corresponding to the previously selected map area from the map mode module corresponding to the second map mode;
- presenting at least a portion of the identified content tiles in a second viewport;
- providing the coordinates of at least one overlay object to the map mode module corresponding to the second map mode;
- receiving a projected location in the viewport corresponding to the coordinates for each of the at least one overlay objects from the map mode module corresponding to the second map mode;
- presenting each of the at least one overlay objects in the second viewport at the projected locations;
- receiving a user input event;
- forwarding the user input event to the map mode module corresponding to the second map mode for interpretation; and
- modifying the view in the second viewport based on the interpreted user input event,
- wherein at least one of the first map mode and the second map mode includes a projection method different than a Mercator projection.

11. The computer implemented method of claim 10, wherein both the first map mode and the second map mode include a projection method different than a Mercator projection.

12. The computer implemented method of claim 10, wherein the user input event comprises at least one of a mouse click, a mouse double click, a mouse wheel movement, a mouse movement, a touch screen gesture, or a keyboard key press.

13. The computer implemented method of claim 10, wherein the second viewport is different from the first viewport.

14. The computer implemented method of claim 10, wherein the map view displayed using the first map mode includes one or more foreground content objects.

15. The computer implemented method of claim 14, wherein the one or more foreground content objects are not presented in the view after the content tiles identified by the map mode module corresponding to the second map mode are presented.

16. A computer based system for displaying map views, comprising:
- (1) a map module having a plurality of interfaces, the interfaces including:
  - an interface for presenting map areas and associated overlay objects as a view in a viewport;
  - an interface for sending and receiving map area data, coordinate data, viewport location data, or a combination thereof to a first map mode interface;
  - an interface for receiving user input events; and
  - an interface for forwarding user input events to a second map mode interface,
  - the first map mode interface and the second map mode interface comprising a single interface;
- (2) a map mode module comprising an algorithm for converting coordinates to a projected viewport location, the module having a plurality of interfaces, including:
  - an interface for receiving map area data, coordinate data, viewport location data, or a combination thereof from a map interface;
  - an interface for receiving input events from a second map interface;
  - an interface for providing content tiles to a third map interface;
  - an interface for providing viewport location data, coordinate data, or a combination thereof to a fourth map interface; and
  - an interface for providing interpreted input events to a fifth map interface; and
- (3) a plurality of content tiles, the content tiles being associated with the algorithm for converting coordinates to a projected viewport location.

17. The system of claim 16, wherein at least two of the map interfaces selected from the first map interface, the second map interface, the third map interface, the fourth map interface, and the fifth map interface comprise a single interface.

* * * * *